United States Patent
Wang

(10) Patent No.: US 9,442,897 B2
(45) Date of Patent: Sep. 13, 2016

(54) SCREENSHOT METHOD AND DEVICE

(71) Applicant: Tencent Technology (Shenzhen) Company Limited, Shenzhen (CN)

(72) Inventor: Biao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/725,394

(22) Filed: May 29, 2015

(65) Prior Publication Data

US 2015/0261726 A1   Sep. 17, 2015

Related U.S. Application Data

(63) Continuation of application No. PCT/CN2013/086727, filed on Nov. 8, 2013.

(30) Foreign Application Priority Data

Dec. 6, 2012   (CN) .......................... 2012 1 0519551

(51) Int. Cl.
*G06F 13/00* (2006.01)
*G06F 17/21* (2006.01)
*G06F 9/44* (2006.01)
*G06F 9/54* (2006.01)

(52) U.S. Cl.
CPC ........... *G06F 17/212* (2013.01); *G06F 9/4443* (2013.01); *G06F 9/543* (2013.01)

(58) Field of Classification Search
CPC .............................. G06F 9/4443; G06F 9/541
USPC .................................................. 719/328, 329
See application file for complete search history.

(56) References Cited

U.S. PATENT DOCUMENTS

| 7,596,540 B2* | 9/2009 | Tzruya | G06F 9/4426 706/45 |
| 8,793,662 B2* | 7/2014 | Needamangala | G06F 8/67 717/130 |
| 8,938,689 B2* | 1/2015 | Kilgore | G06F 9/4443 708/165 |
| 9,111,087 B2* | 8/2015 | Jawa | G06F 21/53 |
| 2007/0214461 A1 | 9/2007 | Glatron et al. | |
| 2012/0233612 A1* | 9/2012 | Beckett | G06F 9/45533 718/1 |

FOREIGN PATENT DOCUMENTS

| CN | 1474267 A | 2/2004 |
| CN | 1963748 A | 5/2007 |
| CN | 101046742 A | 10/2007 |

OTHER PUBLICATIONS

International Search Report from International Application No. PCT/US2013/086727 dated Jan. 30, 2014.
Written Opinion from International Application No. PCT/CN2013/086727, dated Jan. 30, 2014.

* cited by examiner

*Primary Examiner* — Andy Ho
(74) *Attorney, Agent, or Firm* — Marshall, Gerstein & Borun LLP

(57) ABSTRACT

After target software starts, whether a module with an image display function has been loaded by the target software may be determined. When determining that the module with the image display function has been loaded by the target software, a global hook may be injected into the module with the image display function. After receiving a screenshot instruction, screenshot may be executed with the global hook.

20 Claims, 4 Drawing Sheets

SCREENSHOT METHOD AND DEVICE

The application is a continuation application of PCT/CN2013/086727 which claims priority to a Chinese patent application 201210519551.X, titled "screenshot method and device", which was filed on Dec. 6, 2012. The disclosures of the application No. 201210519551.X are incorporated here by reference.

TECHNICAL FIELD

The present disclosure relates to software technologies, and more particularly, to a screenshot method and device.

BACKGROUND

In recent years, with continuous improvements of Internet industry in our country, devices, such as Personal Computers (PCs), intelligent terminals, become more and more popular. Users have put forward various application requirements for devices. During running process, some software may possess various image displays. Users often need to intercept these images. Interception requirements of such image have become more and more popular.

Requirement explanations will be provided in the following accompanying with an example, in which software is network game software. It should be noted that, in the examples of the present disclosure, the software may be any software with an image display during running process, which is not limited to the network game software.

At present, network game industry presents a rapid and stable development trend. Not only an increasingly perfect industry chain and a relatively mature industry development environment have been formed, but also domestic original network game has achieved qualitative change from quantitative change. Network game has implemented continuous and rapid growth in the following aspects, such as game variety, number, theme type, market size and employee number. New game varieties continuously emerge, e.g., from a single large multiplayer online to web game, community game, mobile game. The network game emphasizes that multiplayer simultaneously log on a server to earn online experience together. Thus, the requirements for sharing experience among users become very prominent. During a game process, execute the screenshot rapidly, simply and intelligently without affecting game processes, so as to obtain and share a picture. Subsequently, when playing a network game, a user may simultaneously share experience and fun of the network game with people around conveniently. Meanwhile, no interference may be generated for the game processes, and original user experience of the game may be maintained.

During the process of implementing the examples of the present disclosure, the inventor finds the follows. At present, there are two major classes for schemes of software screenshot. A first class refers to screenshot functions carried by software. However, most of such screenshot schemes are used for the software, which is closely related to structure of the software, and lack of board application scenarios. Thus, the first class of software screenshot scheme may have some limitations. A second class refers to that software doesn't provide the screenshot functions. Users may execute screenshot by using third party screenshot software, so as to meet application requirements of screenshot. Since current screenshot software possesses single functions, and is specifically designed for software the screen of which has been shot. Subsequently, interference may be generated for processes of the software, the screen of which has been shot. Thus, the second class of software screenshot scheme may also have some limitations. In view of above, current screenshot scheme may not execute the screenshot rapidly, simply and intelligently, without affecting processes of the software, the screen of which has been shot. Application scope of current screenshot scheme may be limited.

SUMMARY

Examples of the present disclosure provide a screenshot method and device, so as to execute screenshot rapidly, simply and intelligently, without affecting processes of software, screen of which has been shot. Subsequently, application scope of screenshot scheme may be broader. Rapid, simple and intelligent screenshot may also be implemented.

A screenshot method, includes:

after target software starts, determining whether a module with an image display function has been loaded by the target software;

when determining that the module with the image display function has been loaded by the target software, injecting a global hook into the module with the image displaying function; and after receiving a screenshot instruction, executing a screenshot with the global hook.

A screenshot device, which includes a load determining unit, a hook injecting unit, an instruction receiving unit and a screenshot executing unit, in which the load determining unit is configured to determine whether a module with an image display function has been loaded by target software, after the target software starts;

when the load determining unit determines that the module with the image display function has been loaded by the target software, the hook injecting unit is configured to inject a global hook into the module with the image display function;

the instruction receiving unit is configured to receive a screenshot instruction; and the screenshot executing unit is configured to execute a screenshot with the global hook, after the instruction receiving unit receiving the screenshot instruction.

A screenshot device, includes a memory, a processor in communication with the memory, and an interface, in which the memory stores a load determining instruction, a hook injecting instruction, a receiving instruction and a screenshot executing instruction, which are executable by the processor, the load determining instruction indicates to determine whether a module with an image display function has been loaded by target software, after the target software starts;

when determining that the module with the image display function has been loaded by the target software based on the load determining instruction, the hook injecting instruction indicates to inject a global hook into the module with the image display function;

the receiving instruction indicates to receive a screenshot instruction via the interface; and the screenshot executing instruction indicates to execute a screenshot with the global hook, after the screenshot instruction has been received based on the receiving instruction.

Based on the foregoing technical solutions, it can be seen that, the examples of the present disclosure may have the following advantages. When determining that a module with an image display function has been loaded by target software, inject a global hook into the module with the image display function. Execute screenshot with the global hook.

During the process of implementing the screenshot, processes of software, screen of which has been shot, may be not affected. Application scope of screenshot scheme may be broader. Screenshot scheme may be implemented simply and intelligently. The screenshot may be only performed on image contents related with the software, screen of which has been shot, such that screenshot of other contents, e.g., background elements, may be avoided. The screenshot may be implemented conveniently.

BRIEF DESCRIPTIONS OF THE DRAWINGS

To describe technical solutions in the examples of the present disclosure more clear, brief introductions about attached figures used when describing the examples will be provided in the following. Obviously, the attached figures described in the following only some examples of the present disclosure. For persons having ordinary skill in the art, other figures may also be obtained based on these attached figures without creative efforts.

DETAILED DESCRIPTIONS

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

Figure 1:
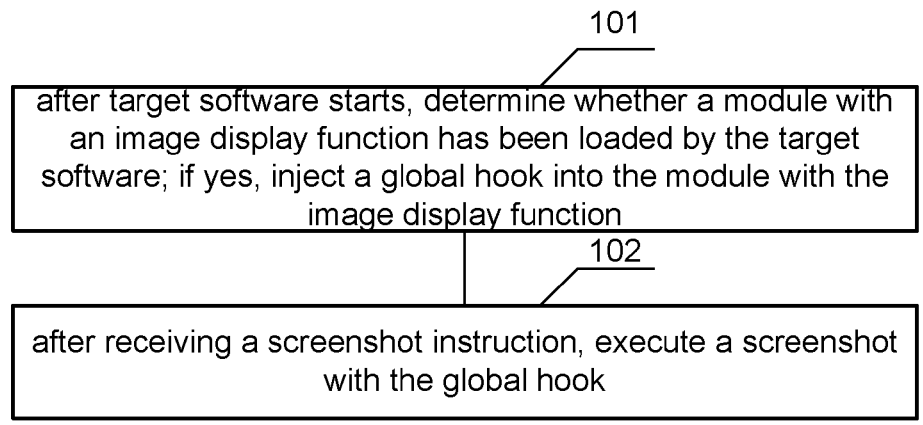
FIG. 1 is a flowchart illustrating a method, in accordance with an example of the present disclosure.

An example of the present disclosure provides a screenshot method. As shown in FIG. 1, the method may include the following blocks.

In block 101, after target software starts, determine whether a module with an image display function has been loaded by the target software. When determining that the module with the image display function has been loaded by the target software, inject a global hook into the module with the image display function.

Take game software as an example, at present, most of the network games in the market use direct extension (DirectX) technologies to display an image, which may be implemented with C++ programming language, comply with the Component Object Model (COM), and is widely used in the development of various image processing software. DirectX refers to a group of technologies, aiming to enable a computer to become an ideal platform, which may run and display an application program with rich multimedia elements (such as full-color graphics, video, three-dimensional (3D) animation and rich audio). DirectX may be formed by many Application Programming Interfaces (APIs), which may be divided into four categories based on properties, that is, display part, voice part, input part and network part. In the example, the display part in the DirectX, which occupies an important proportion in the network game, may be divided into DirectDraw (Ddraw, which is a basic part about video input and output in the DirectX) and Direct3D (D3D, a display program interface). DirectDraw is mainly in charge of 2-dimensional (2D) image acceleration. Direct3D is mainly in charge of 3D effects display, for example, scenes and characters in various 3D pictures may be Direct3D employing the DirectX. Under the circumstances that the target software is based on DirectX, after determining whether the module with the image display function has been loaded by the target software, it may be determined that whether a module, such as D3D8.dll or D3D9.dll, has been loaded by a main game function. If yes, it may be further determined that image interface of the started game may be rendered by the DirectX technologies.

When determining that a module without the image display function has been loaded by the target software, there may be no image displayed, and screenshot is not necessary. Alternatively, the scheme put forward by the example does not support screenshot of such target software. Subsequently, the screenshot may be failed. The case, in which a module without the image display function has been loaded by the target software, is not limited by the examples of the present disclosure.

The process of injecting the global hook into the target software may generally be implemented with an Operating System (OS). Specific injection process is not limited by the examples of the present disclosure.

In block 102, after receiving a screenshot instruction, execute screenshot with the global hook.

In accordance with the foregoing scheme, after determining that the module with the image display function has been loaded by the target software, inject the global hook into the module with the image display function. Execute the screenshot with the global hook. During the process of implementing the screenshot, processes of the software, screen of which has been shot, may be not affected. Subsequently, application scope of the screenshot scheme may be broader. Screenshot may be achieved simply and intelligently. The screenshot may be only performed on the image contents related with the software, screen of which has been shot, and screenshot of other contents, such as background elements, may be avoided. Thus, screenshot may be implemented conveniently.

More specifically, an example of the present disclosure has provided a specific screenshot implementation mode applicable to DirectX. The foregoing process of executing the screenshot with the global hook, after receiving the screenshot instruction may include the follows. Obtain an image outputted by the module with the image display function with the global hook, transmit the image to the API and display the image. When receiving the screenshot instruction, intercept the image obtained with the global hook.

Furthermore, when executing the screenshot, to ensure that a screenshot logic is executed firstly, and then image related with the target software is displayed, so as to implement the screenshot timely and accurately, an example of the present disclosure provides the following solution. After injecting the global hook into the module with the image display function, mark a main function of the target software as being loaded by a screenshot process.

More specifically, an example of the present disclosure also provides a specific implementation mode about using a library function hook. The process of obtaining the image outputted by the module with the image display function with the global hook may include the follows. Determine a target function with the global hook, and allocate a new memory with an alternate function of the target function. And then, copy image data of the target function to the new memory. The foregoing image is an image in the new memory, when receiving the screenshot instruction.

Furthermore, an example of the present disclosure also provides a specific implementation solution using foregoing screenshot scheme, which does not affect related image display of the target software. Before allocating the new memory with the alternate function of the target function, the method further includes the follows. Determine the function address of the target function to be intercepted with the global hook. Copy the target function of foregoing function address. The foregoing processes of transmitting the image to the API, and displaying the image may include the follows. After copying the image data of the target function to the new memory, the alternate function may exit. Restore and run the copied target function.

Preferably, the alternate function may be a development library function newly written. By using the development library function, smooth connection with the OS may be implemented, and compatibility may also be improved.

Preferably, since there may be differences among various OSs running the target software, an example of the present disclosure also provides a specific implementation mode for a possible error of the determined address about the target software, resulted from foregoing differences. The foregoing process of determining the function address of the target function to be intercepted may include the follows. Utilize an API function provided by a programming interface DirectX, so as to create an interface object of the interface API function used for image display. Utilize the interface object to export a device object of the display program interface. Determine the function address of the target function, based on a first address of a virtual function table about the device object, and the location of an export function of the API function.

The foregoing contents have provided examples of various implementation modes about executing the screenshot with the global hook, after receiving the screenshot instruction. In subsequent examples in which the target software is the network game, detailed descriptions may be further provided.

Furthermore, an example of the present disclosure also provides a specific implementation mode about screenshot based on requirements, when the screenshot is finished, the method may further include the follows. Based on a user instruction, convert the image data obtained after screenshot into an image, in which specification and parameters of the image have been specified by the user instruction.

Furthermore, there is also provided an example about a usage implementation mode, after executing the screenshot based on requirements. The foregoing method may further include the follows. Transmit the image to an address specified by the user instruction, in which the specification and parameters of the image have been specified by the user instruction. The foregoing specified address may be addresses with various manifestations, such as microblog, network space, blog. Specific address manifestations are not limited by the present disclosure.

More detailed descriptions will be provided in the following with an example, in which the target software is the network game. The following contents are mainly divided into four parts, which are respectively identification of a network game, interception of a game interface, generate a game screenshot and share rapidly, as well as screenshot flow summary.

The first part refers to identification of a network game.

Take game software as an example, at present, most of the network games in the market use DirectX technologies to display an image, which may be implemented with C++ programming language, comply with the COM, and is widely used in the development of various image processing software. DirectX refers to a group of technologies, aiming to enable a computer to become an ideal platform, which may run and display an application program with rich multimedia elements (such as full-color graphics, video, 3D animation and rich audio). DirectX may be formed by many APIs, which may be divided into four categories based on properties, that is, display part, voice part, input part, and network part. In the example, the display part in the DirectX, which occupies an important proportion in the network game, may be divided into DirectDraw (Ddraw, which is a basic part about video input and output in the DirectX) and Direct3D (D3D, a display program interface). DirectDraw is mainly in charge of 2D image acceleration. Direct3D is mainly in charge of 3D effects display, for example, scenes and characters in various 3D pictures may be Direct3D employing the DirectX. Under the circumstances that the destination software is based on DirectX, after determining whether the module with the image display function has been loaded by the destination software, it may be determined that whether a module, such as D3D8.dll or D3D9.dll, has been loaded by a main game function. If yes, it may be further determined that image interface of the started game may be rendered by the DirectX technologies.

In the example of the present disclosure, the screenshot process may distinguish the displaying module (that is, the module with the image display function) loaded by the game, when the game starts. When determining that a module, such as D3D8.dll or D3D9.dll, has been loaded by the game main function, it may be determined that the image interface of the started game is rendered by using the DirectX technologies. At this time, the screenshot process may be initiated. When loading of these two modules is not detected, the screenshot process may immediately exit, so as to achieve the objective of identifying a network game intelligently.

The second part refers to interception of a game interface.

When completing the identification of network game in the previous block, the screenshot process has already been started and run in the background. The main work principle of the screenshot process is to employ a hook mechanism of the Windows Operating System. Accompanying with startup process of the network game software, the screenshot process may inject a hook into the displaying module, such as D3D8.dll or D3D9.dll, in the processes of the game software. In the example of the present disclosure, a global hook of WH_CBT type may be employed. When the game process starts, the windows operating system may inject a Dynamic Link Library (dll) with the global hook into all of the running processes. Thus, it may be guaranteed that a sub-process with camera function may enter the game process smoothly. After the dll with the global hook has been injected into the game process, a logic of the screenshot function (referred to as screenshot logic) may be firstly executed, when needing to be injected. Thus, under the circumstances that being implemented technically, in the example of the present disclosure, when adding the function of the screenshot logic to the dll and starting to execute the function, that is, the entry function dll main (the main function of dll) has been marked as within the logic of DLL_PROCESS_ATTACH (when a progress loads a dll file, this parameter may be transmitted, which may demonstrate that a process has loaded the dll). Thus, it may be ensured that the screenshot logic within the hook may be executed firstly, when displaying the game on the interface.

In a game using the DirectX to display, game dynamic effects may be represented in the manner of frame display. The effects of frame display may be provided by the API function in the D3D8.dll or D3D9.dll. When using the following technical solution, game picture may be intercepted without affecting fluency of the game. Intercept image data before the image data is displayed on the game interface. Copy the image data in the memory. And finally transmit the image data back to the API of the DirectX. To achieve the objective of hooking the API function in the DirectX of the game process, an example of the present disclosure may employ a hook development library, that is, detour. The process of hooking with the detour library may include the follows.

(1) Determine a function address of the target function to be intercepted, that is, a function pointer. The target function is the API function to be hooked.

(2) Since the detour may modify the target function (detour will amend the target function), a copy of the target function may be firstly written. Store the copied target function. From one aspect, process calling semantics of the target function may be stored. From another aspect, subsequent restoring may be convenient.

(3) Write a detour function to replace a function of the target function. Allocate a new memory, and copy the image data to the newly allocated memory.

(4) After copying of the image data has been finished, the detour function may immediately exit. Restore the copy of the target function, so as to ensure normal running of a display process in the game.

Regarding the function address (that is, exported function address) of the target function obtained in block (1), a general implementation mode may employ LoadLibrary (LoadLibrary may load a specified dll, and map the specified dll to address space used by current process. Once being loaded, resources stored within the library may be accessed), based on the name of the target function, employ an API function GetProcAddress (GetProcAddress is to obtain a certain export function of one dll) of a standard windows operating system to call and obtain functions of a certain dll. However, in practical usage process, the inventor finds that a wrong function address may be obtained by some window operating systems, when using the foregoing mode. Subsequently, the API of corresponding D3D8.dll or D3D9.dll may be not hooked. Since data amount employed by users of domestic windows operating system is very large, to ensure effectiveness of screenshot, an example of the present disclosure may use a mode to calculate a function offset, such that corresponding function address may be obtained accurately. Specific processes will be briefly described in the following.

(1.1) Firstly, utilize the API function provided by the DirectX to create an interface object of IDirect3D9 or IDirect3D8.

(1.2) Utilize the export function CreateDevice of foregoing interface object to create a device object of D3D. The device object may include a data display function.

(1.3) Obtain a first address of a virtual function table about the device object. Obtain the address of the target function to be intercepted, based on location of the export function provided by D3D8.h or D3D9.h. IDirect3D9, IDirect3D8, CreateDevice, D3D8.h and D3D9.h are interface API functions used for image display, which are related with game development.

After completing the four blocks of hooking with the detour library, functions of intercepting the target function in D3D8.dll or D3D9.dll with the detour function in a game display process may be implemented technically. In practical running process, the inventor finds that, although a memory has been allocated and copying has been executed before displaying by the game interface, by using the hook mode of the detour function, impact on game process may be negligible. Users may not feel non-fluent game or drag-tail phenomenon. Thus, smooth running of the game may still be guaranteed.

The third part refers to generating and rapidly sharing a game screenshot.

In the second part, since screenshot data of a game interface needed by a user has already been copied to specified memory space, by hooking detours function to D3D8.dll or D3D9.dll, based on technical documents of DirectX. The screenshot data may be original data which only includes pixel information. To enable a user to directly view that the data may be converted into an image format of a certain format, the screenshot process may convert the game screenshot into a BitMap (bmp, a bit-map format) image of Device Independent Bitmap (DIB) type based on default settings. A user may also select type and path of a picture to be saved in the settings, based on the user's preferences. The user may also share the saved picture to Social Networking Services (SNS) applications, such as microblog or space, so as to share game experience with the user's buddies.

Figure 2:
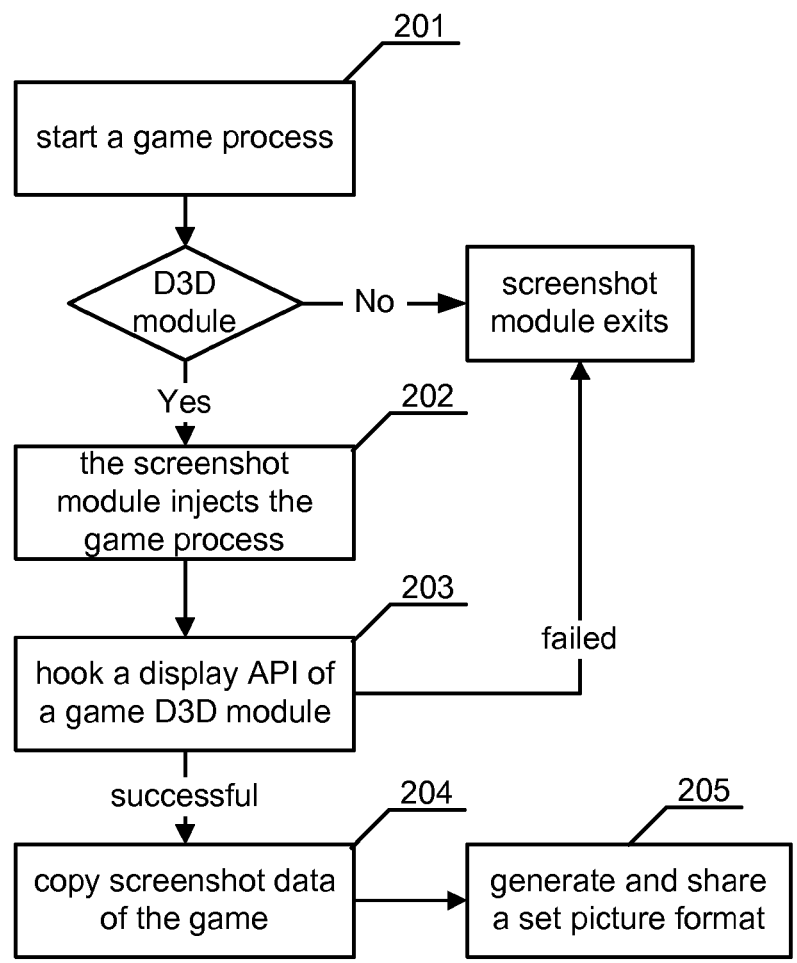
FIG. 2 is a flowchart illustrating another method, in accordance with an example of the present disclosure.

The fourth part refers to screenshot flow summary, as shown in FIG. 2, it may include the follows.

In block 201, a game process is started. After a user starts the game process, the user may determine whether a D3D module has been loaded. In the block, whether a D3D module in the DirectX is included in a displaying module of a game may be determined, based on a startup rule of a screenshot module. When detecting that the D3D module of the DirectX is not included, the screenshot module may exit; otherwise, proceed with block 202.

In block 202, the game process is injected into the screenshot module.

Specifically speaking, a window global hook may be defined in a function dll of the screenshot module. When programs of the screenshot module start, the global hook may be injected into all processes in the system. Subsequently, a module with screenshot function may run in the process space of the game.

In block 203, hook the displaying API of the game D3D module.

Specifically speaking, employ a detours library (a development library of microsoft, which may have the following functions. 1, intercept any win32 API function of x86 machine; 2, insert any data segment into a pre-installation environment (PE) file, and modify an import table of a ddl file) of Windows. Hook the API function of the D3D module. Define own detours function to replace functions of the target function about D3D module in the game process. The screenshot module may exit when failed. Proceed with block 204 when successful.

In block 204, copy game screenshot data.

Utilize the detours function to enable the screenshot module to correctly copy pixel data of an image screenshot displayed by current game, and write the pixel data into hardware based on a set picture format.

In block 205, generate and share the set picture format.

Based on the picture format defined by a user, generate a corresponding game screenshot image. By providing sharing functions, a user may be enabled to share the picture to microblog or SNS.

Figure 3:
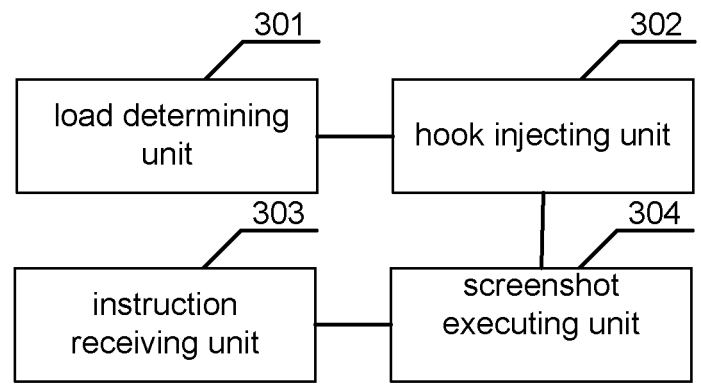
FIG. 3 is a schematic diagram illustrating structure of a device, in accordance with an example of the present disclosure.

An example of the present disclosure also provides a screenshot device. As shown in FIG. 3, the device may include a load determining unit 301, a hook injecting unit 302, an instruction receiving unit 303 and a screenshot executing unit 304.

After target software starts, the load determining unit 301 is configured to determine whether a module with image display function has been loaded by the target software.

The hook injecting unit 302 is configured to inject a global hook into the module with the image display function, when the load determining unit 301 determines that the module with the image display function has been loaded by the target software.

The instruction receiving unit 303 is configured to receive a screenshot instruction.

The screenshot executing unit 304 is configured to execute screenshot with the global hook, after the instruction receiving unit 303 has received the screenshot instruction.

In accordance with the foregoing implementation scheme, after determining that the module with the image display function has been loaded by the target software, inject the global hook into the module with the image display function. Execute the screenshot with the global hook. During the process of implementing the screenshot, processes of software, screen of which has been shot, may be not affected. Application scope of the screenshot scheme may be broader. The screenshot may be implemented simply and intelligently. Image contents related with the software, screen of which has been shot, may be intercepted. Interception of other elements, such as background elements, may be avoided. Thus, the screenshot may be implemented conveniently.

Figure 4:
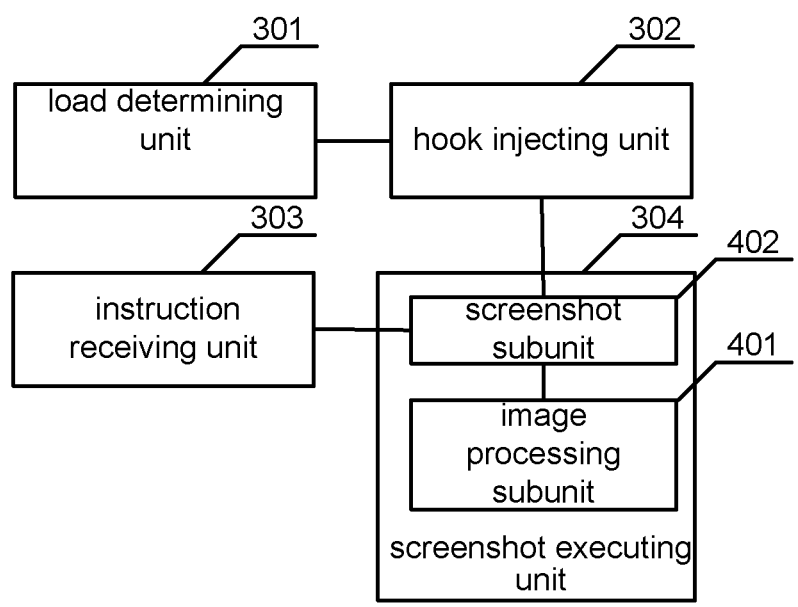
FIG. 4 is a schematic diagram illustrating structure of a device, in accordance with an example of the present disclosure.

Optionally, an example of the present disclosure provides a specific implementation mode about screenshot applicable to the DirectX. As shown in FIG. 4, the foregoing screenshot executing unit 304 may include an image processing subunit 401 and a screenshot subunit 402.

The image processing subunit 401 is configured to obtain an image outputted by the module with the image display function by using the global hook, transmit the image to the API, and display the image.

The screenshot subunit 402 is configured to intercept current image obtained by the image processing subunit 401, when receiving the screenshot instruction.

Figure 5:
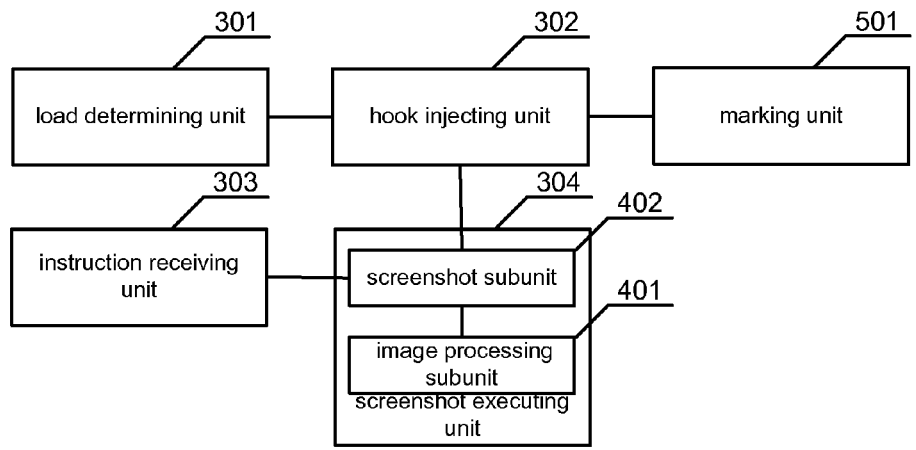
FIG. 5 is a schematic diagram illustrating structure of a device, in accordance with an example of the present disclosure.

Furthermore, to guarantee that the screenshot logic is firstly executed during the screenshot process, and then image related with the target software may be displayed, so as to implement the screenshot timely and accurately, an example of the present disclosure may provide the following technical solution. As shown in FIG. 5, the foregoing device may further include a marking unit 501.

After the hook injecting unit 302 injecting the global hook into the module with the image displaying function, the marking unit 501 is configured to mark a main function in the target software as being loaded by the screenshot process.

More specifically, an example of the present disclosure also provides a specific implementation mode about using a library function hook. The procedure of the image processing subunit 401 obtaining the image outputted by the module with the image display function by using the global hook may include the follows. The image processing subunit 401 may determine the target function with the global hook, allocate a new memory with the alternate function of the target function, and then copy the image data of the target function to the new memory. The foregoing current image is an image in the new memory, when receiving the screenshot instruction.

More specifically, an example of the present disclosure also provides a specific implementation scheme, which utilizes the foregoing screenshot scheme without affecting displaying of image related with the target software. The foregoing image processing subunit 401 is further configured to determine a function address of the target function to be intercepted by using the global hook, and copy the target function of the function address, before allocating the new memory with the alternate function of the target function. The foregoing processes of transmitting the image to the API and displaying the image may include the follows. After copying the image data of the target function to the new memory, the alternate function may exit. Restore and run the copied target function.

More specifically, since OSs employed when running the target software may be different from each other, an example of the present disclosure also provides a specific implementation mode for solving a possible error about address of the target function, which may be resulted from the foregoing difference. The foregoing procedure of the image processing subunit 401 determining the function address of the target function to be intercepted may include the follows. The image processing subunit 401 may utilize an API function provided by the programming interface DirectX, so as to create an interface object of an interface API function used for image display. By utilizing the interface object, the device object of the displaying program interface may be exported. Based on the first address of the virtual function table of the device object, and the location of the export function of the API function, the function address of the target function may be determined.

Figure 6:
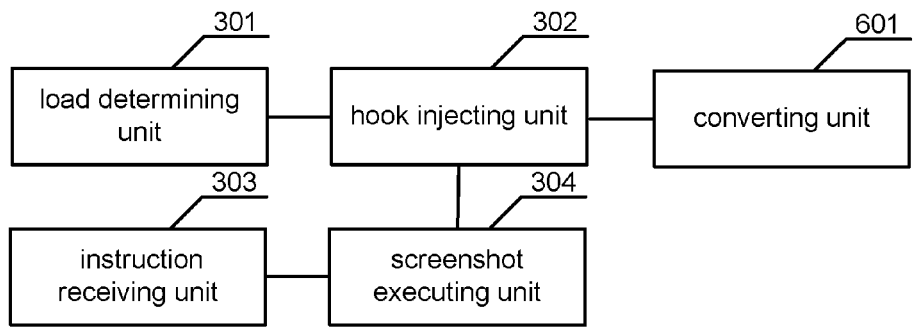
FIG. 6 is a schematic diagram illustrating structure of a device, in accordance with an example of the present disclosure.

Furthermore, an example of the present disclosure also provides a specific implementation mode about screenshot based on requirements. As shown in FIG. 6, the instruction receiving unit 303 is further configured to receive a user instruction.

The foregoing device may further include a converting unit 601. After the screenshot is completed, the converting unit 601 is configured to convert the image data, which is obtained after screenshot based on the foregoing user instruction received by the instruction receiving unit 303, into an image with specification and parameters specified by the user instruction.

Figure 7:
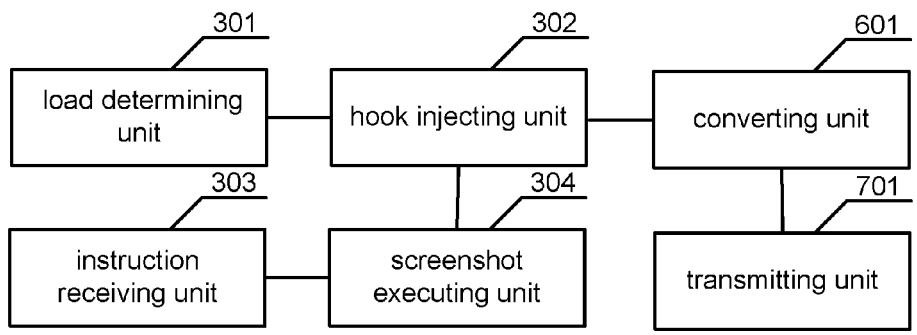
FIG. 7 is a schematic diagram illustrating structure of a device, in accordance with an example of the present disclosure.

Furthermore, an example of the present disclosure also provides a usage implementation mode after screenshot based on requirements. As shown in FIG. 7, the foregoing device 7 may further include a transmitting unit 701.

The transmitting unit 701 is configured to transmit the image with the specification and parameters specified by the user instruction, which is obtained by the converting unit 601, to an address specified by the user instruction.

It should be noted that, in the foregoing device example, each included unit may be divided based on functional logic. The foregoing division is not limited, only if corresponding functions may be implemented. Besides, a specific name about each function unit is only for differentiating from each other, which is not used for limiting the protection scope of the present disclosure.

Besides, persons having ordinary skill in the art may understand that all of or part of blocks in foregoing each method example may be completed by related hardware instructed by a program. The corresponding program may be stored in a computer readable storage medium, which may be a read-only Memory (ROM), disk, compact disk (CD) and so on.

Figure 8:
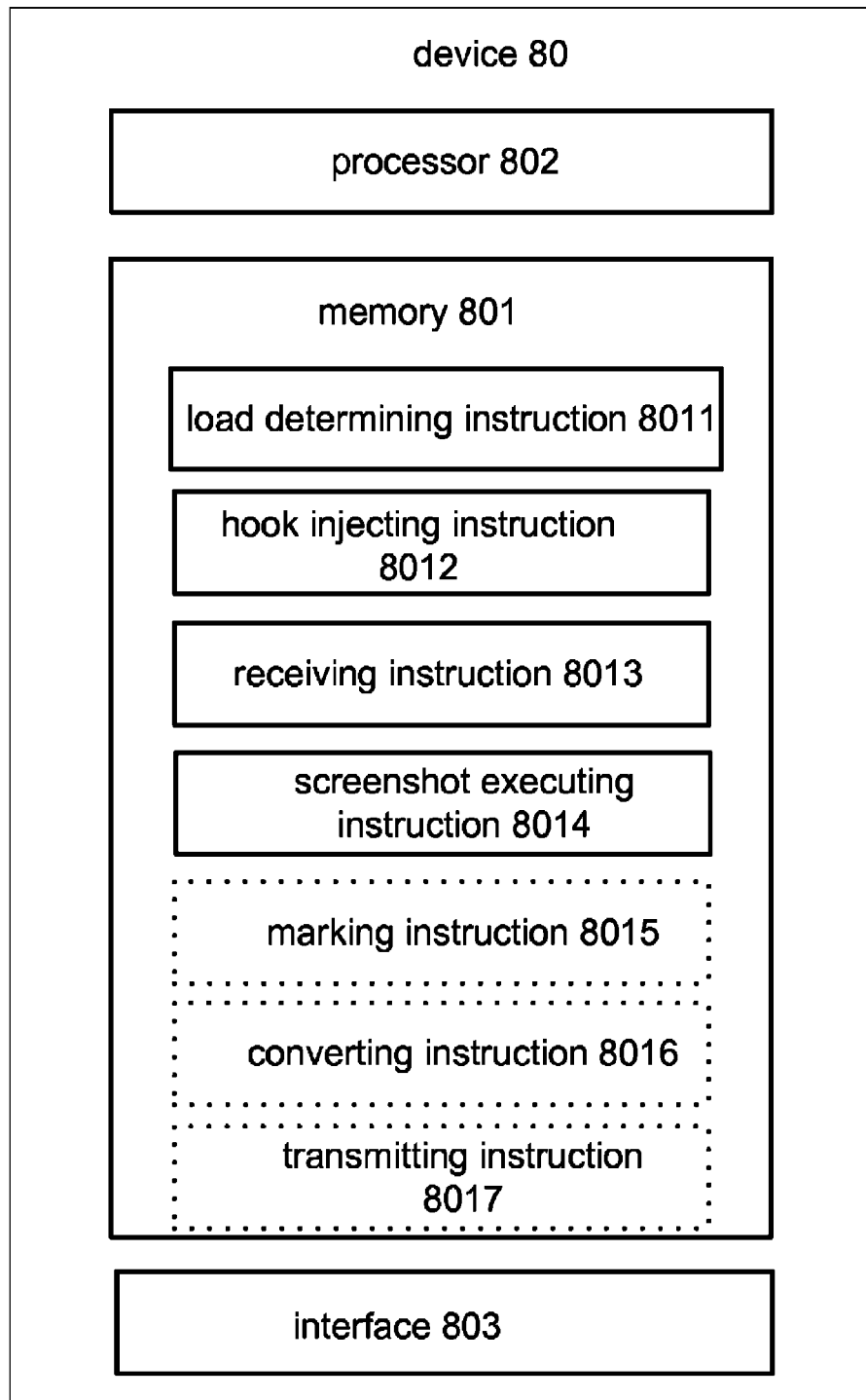
FIG. 8 is a schematic diagram illustrating structure of a device, in accordance with an example of the present disclosure.

An example of the present disclosure also provides a screenshot device. As shown in FIG. 8, the device 80 may include a memory 801, a processor 802 in communication with the memory 801, and an interface 803. The memory 801 may store a load determining instruction 8011, a hook injecting instruction 8012, a receiving instruction 8013 and a screenshot executing instruction 8014, which are executable by the processor 802.

After target software starts, the load determining instruction 8011 indicates to determine whether a module with an image display function has been loaded by the target software.

The hook injecting instruction 8012 indicates to inject a global hook into the module with the image display function via the interface 803, when determining that the module with the image display function has been loaded by the target software based on the load determining instruction 8011.

The receiving instruction 8013 indicates to receive a screenshot instruction via the interface 803.

The screenshot executing instruction 8014 indicates to execute a screenshot with the global hook, after the screenshot instruction has been received based on the receiving instruction 8013.

In accordance with the foregoing implementation scheme, after determining that the module with the image display function has been loaded by the target software, inject the global hook into the module with the image display function. Execute the screenshot with the global hook. During the process of implementing the screenshot, processes of software, screen of which has been shot, may be not affected. Application scope of the screenshot scheme may be broader. The screenshot may be implemented simply and intelligently. Image contents related with the software, screen of which has been shot, may be intercepted. Interception of other elements, such as background elements, may be avoided. Thus, the screenshot may be implemented conveniently.

Furthermore, the screenshot executing instruction 8014 may further include an image processing instruction 80141 and a screenshot instruction 80142 (not shown in the figure), which are executable by the processor 802. When being executed, functions implemented by the image processing instruction 80141 and the screenshot instruction 80142 may be respectively similar to that of the image processing subunit 401 and the screenshot subunit 402 in the foregoing examples, which will not be repeated here.

Furthermore, the memory 801 may further store a marking instruction 8015, a converting instruction 8016 and a transmitting instruction 8017, which are executable by the processor 802. When being executed, functions implemented by the marking instruction 8015, the converting instruction 8016 and the transmitting instruction 8017 may be respectively similar to that of the marking unit 501, the converting unit 601 and the transmitting unit 701 in the foregoing examples, which will not be repeated here.

The invention claimed is:

1. A screenshot method, comprising:
after target software starts, determining whether a module with an image display function has been loaded by the target software;
when determining that the module with the image display function has been loaded by the target software, injecting a global hook into the module with the image displaying function; and
after receiving a screenshot instruction, executing a screenshot with the global hook;
wherein after receiving the screenshot instruction, executing the screenshot with the global hook, comprises:
obtaining an image outputted by the module with the image display function by using the global hook, transmitting the image to an Application Programming Interface (API), and displaying the image;
when receiving the screenshot instruction, intercepting the image obtained with the global hook.

2. The method according to claim 1, further comprising:
after injecting the global hook into the module with the image display function, marking a main function of the target software as being loaded by a screenshot process.

3. The method according to claim 1, wherein obtaining the image outputted by the module with the image display function by using the global hook comprises:
determining a target function with the global hook;
allocating a new memory with an alternate function of the target function; and
copying image data of the target function to the new memory;
wherein the image is an image in the new memory, when receiving the screenshot instruction.

4. The method according to claim 3, further comprising:
before allocating the new memory with the alternate function of the target function, determining a function address of the target function to be intercepted with the global hook, and copying the target function of the function address;
wherein transmitting the image to the API and displaying the image comprise:
after copying the image data of the target function to the new memory, the alternate function exiting; and
restoring and running the target function copied.

5. The method according to claim 4, wherein the alternate function is a development library function newly written.

6. The method according to claim 4, wherein determining the function address of the target function to be intercepted comprises:
utilizing an API function provided by a programming interface DirectX to create an interface object of an interface API function used for image display;
utilizing the interface object to export a device object of a displaying program interface; and determining the function address of the target function, based on a first address of a virtual function table of the device object, and location of an export function of the API function.

7. The method according to claim 1, further comprising:
after the screenshot is completed, based on a user instruction, converting image data obtained after the screenshot into an image with specification and parameters specified by the user instruction.

8. The method according to claim 7, further comprising:
transmitting the image with the specification and parameters specified by the user instruction to an address, which is specified by the user instruction.

9. A screenshot device, comprising a load determining unit, a hook injecting unit, an instruction receiving unit and a screenshot executing unit, wherein
the load determining unit is configured to determine whether a module with an image display function has been loaded by target software, after the target software starts;
when the load determining unit determines that the module with the image display function has been loaded by the target software, the hook injecting unit is configured to inject a global hook into the module with the image display function;
the instruction receiving unit is configured to receive a screenshot instruction; and
the screenshot executing unit is configured to execute a screenshot with the global hook, after the instruction receiving unit receiving the screenshot instruction;
wherein the screenshot executing unit comprises an image processing subunit and a screenshot subunit;
the image processing subunit is configured to obtain an image outputted by the module with the image display function by using the global hook, transmit the image to an Application Programming Interface (API), and display the image; and
the screenshot subunit is configured to intercept the image obtained by the image processing subunit, when the screenshot instruction is received.

10. The device according to claim 9, further comprising a marking unit, which is configured to mark a main function in the target software as being loaded by a screenshot process, after the hook injecting unit injecting the global hook into the module with the image display function.

11. The device according to claim 9, wherein the image processing subunit is further configured to determine a target function with the global hook, allocate a new memory with an alternate function of the target function, copy image data of the target function to the new memory, wherein the image is an image in the new memory, when the screenshot instruction is received.

12. The device according to claim 11, wherein the image processing subunit is further configured to determine a function address of the target function to be intercepted with the global hook, and copy the target function of the function address, before allocating the new memory with the alternate function of the target function; and
the image processing subunit is further configured to enable the alternate function to exit, restore and run the target function copied, after copying the image data of the target function to the new memory.

13. The device according to claim 12, wherein the image processing subunit is further configured to utilize an API function provided by a programming interface DirectX, create an interface object of an interface API function used for image display, utilize the interface object to export a device object of a displaying program interface, and determine the function address of the target function, based on a first address of a virtual function table of the device object, and location of an export function of the API function.

14. The device according to claim 9, wherein the instruction receiving unit is further configured to receive a user instruction, and the device further comprises a converting unit; and
after the screenshot is completed, the converting unit is further configured to convert the image data, which is obtained after the screenshot based on the user instruction received by the instruction receiving unit, into an image with specification and parameters specified by the user instruction.

15. The device according to claim 14, further comprising a transmitting unit, wherein the transmitting unit is configured to transmit the image, which is with the specification and parameters specified by the user instruction and obtained by the converting unit, to an address specified by the user instruction.

16. A screenshot device, comprising a memory, a processor in communication with the memory, and an interface, wherein the memory stores a load determining instruction, a hook injecting instruction, a receiving instruction and a screenshot executing instruction, which are executable by the processor,
the load determining instruction indicates to determine whether a module with an image display function has been loaded by target software, after the target software starts;
when determining that the module with the image display function has been loaded by the target software based on the load determining instruction, the hook injecting instruction indicates to inject a global hook into the module with the image display function;
the receiving instruction indicates to receive a screenshot instruction via the interface; and
the screenshot executing instruction indicates to execute a screenshot with the global hook, after the screenshot instruction has been received based on the receiving instruction;
wherein the screenshot executing instruction comprises an image processing instruction and the screenshot instruction;
the image processing instruction indicates to obtain an image outputted by the module with the image display function by using the global hook, transmit the image to an Application Programming Interface (API), and display the image; and
the screenshot instruction indicates to intercept the image obtained based on the image processing instruction, when the screenshot instruction is received.

17. The device according to claim 16, wherein the memory further stores a marking instruction executable by the processor, the marking instruction indicates to mark a main function in the target software as being loaded by a screenshot process, after the global hook has been injected into the module with the image display function based on the hook injecting instruction.

18. The device according to claim 16, wherein the image processing instruction further indicates to determine a target function with the global hook, allocate a new memory with an alternate function of the target function, copy image data of the target function to the new memory, wherein the image is an image in the new memory, when the screenshot instruction is received.

19. The device according to claim 16, wherein the receiving instruction further indicates to receive a user instruction, the memory further stores a converting instruction executable by the processor; and after the screenshot is completed, the converting instruction indicates to convert the image data, which is obtained after the screenshot based on the user instruction, into an image with specification and parameters specified by the user instruction.

20. The device according to claim 19, wherein the memory further stores a transmitting instruction executable by the processor, and the transmitting instruction indicates to transmit the image, which is with the specification and parameters specified by the user instruction and obtained based on the converting instruction, to an address specified by the user instruction.

* * * * *